US012738657B2

(12) United States Patent
Okatan et al.

(10) Patent No.: US 12,738,657 B2
(45) Date of Patent: Sep. 15, 2026

(54) MICROSTRIP PATCH ANTENNA WITH CONCAVE BOTTOM LAYER ON TWO SIDES

(71) Applicants: Ali Okatan, Istanbul (TR); Cihan Dogusgen, Istanbul (TR)

(72) Inventors: Ali Okatan, Istanbul (TR); Cihan Dogusgen, Istanbul (TR)

( * ) Notice: Subject to any disclaimer, the term of this patent is extended or adjusted under 35 U.S.C. 154(b) by 114 days.

(21) Appl. No.: 18/716,982

(22) PCT Filed: Jan. 9, 2023

(86) PCT No.: PCT/TR2023/050018
§ 371 (c)(1),
(2) Date: Jun. 6, 2024

(87) PCT Pub. No.: WO2023/132813
PCT Pub. Date: Jul. 13, 2023

(65) Prior Publication Data

US 2025/0047001 A1 Feb. 6, 2025

(51) Int. Cl.
*H01Q 9/04* (2006.01)
*H01Q 1/22* (2006.01)
*H01Q 1/36* (2006.01)

(52) U.S. Cl.
CPC ......... *H01Q 9/0471* (2013.01); *H01Q 1/2291* (2013.01); *H01Q 1/36* (2013.01)

(58) Field of Classification Search
CPC ...... H01Q 9/0471; H01Q 9/0407; H01Q 9/28; H01Q 19/12; H01Q 1/38; H01Q 1/273; H01Q 1/2291; H01Q 1/36
See application file for complete search history.

(56) References Cited

U.S. PATENT DOCUMENTS

2002/0036590 A1* 3/2002 Itoh ...................... H01Q 1/2283 343/702
2004/0051675 A1* 3/2004 Inoue ...................... H01Q 5/40 343/728
2014/0361931 A1 12/2014 Irci et al.

FOREIGN PATENT DOCUMENTS

CN 104143689 A 11/2014
CN 113594673 A 11/2021
EP 0394960 A1 * 10/1990 ........... H01Q 9/0471
WO 2021251735 A1 12/2021

* cited by examiner

*Primary Examiner* — Dimary S Lopez Cruz
*Assistant Examiner* — Anna N Hamadyk
(74) *Attorney, Agent, or Firm* — Egbert, McDaniel & Swartz, PLLC

(57) ABSTRACT

A microstrip patch antenna with a two-sided concave substrate can be used simultaneously in all WLAN, 4G LTE and 5G wireless technologies, especially in the frequency range 4940-5600 MHz, serving in frequency bands determined by the standards the distinctive feature of which is; a lower base formed in a circular form on the horizontal axes with both surfaces concave on the vertical axis, the ground plane located in the lower part of the lower base and having a concave structure, the lower base to the top surface of the lower base with a frequency range can be adjusted and fixed in a single piece form that is built to work in a wide frequency range and the first slot and the second slot that contains a patch, the impedance matching line electrically connected to the patch so that it is one piece with the lower base and patch.

8 Claims, 6 Drawing Sheets

MICROSTRIP PATCH ANTENNA WITH CONCAVE BOTTOM LAYER ON TWO SIDES

CROSS REFERENCE TO THE RELATED APPLICATIONS

This application is the national phase entry of International Application No. PCT/TR2023/050018, filed on Jan. 9, 2023, which is based upon and claims priority to Turkish Patent Application No. 2022/000230, filed on Jan. 10, 2022, the entire contents of which are incorporated herein by reference.

TECHNICAL FIELD

This invention relates to a microstrip patch antenna with a two-sided concave substrate, which can be used simultaneously in all WLAN, 4G LTE and 5G wireless technologies, especially in the frequency range 4940-5600 MHz, serving in frequency bands determined by the standards.

BACKGROUND

The coverage, quality and capability of wireless communication systems depend on the antennas used in these systems. The small size, low loss, easy production and low cost of antennas increase the success of wireless communication systems.

WLAN technology, which performs data transmission by providing secure and high-speed wireless access to a network infrastructure, is widely used. With WLAN, a mobile user can connect wirelessly to a local area network. In this way, connection is provided within the desired area without the need for long network cables. In addition, the user does not lose his connection even if he is located in different places in the accessed region. WLAN can support the simultaneous use of hundreds of devices as it does not include wired device connection, and the WLAN range can be expanded by using one or more repeaters.

4G LTE, which is used in wireless systems, is the fourth generation portable network technology and is the successor of 3G technology with high-speed data transmission, fast network connection and high network volume. With 4G LTE, benefits such as more application usage on portable devices, faster sharing of large files and videos in real time, and immediate transfer of time-sensitive information are provided.

5G is the fifth generation technology standard for broadband networks. 5G is planned to replace 4G in many wireless systems in use today. 5G, rather than being a continuation of 4G, aims to have an innovative structure in terms of high data rate, low waiting time, mass connection, network security and energy efficiency features. The mentioned features will take place in applications such as the internet of things, telemedicine, smart city management and augmented virtual reality. Very large data, especially high resolution and 3D videos will be able to be transferred to more people at high speeds.

Today, the radiation frequency ranges determined by the standards for WLAN, 4G LTE and 5G technologies are presented below:

WLAN technologies; 5150 MHz to 5350 MHz
WLAN technologies; 5470 to 5575 MHz
4G LTE technologies; 5150 to 5250 MHz
5G technologies; 4940 to 4990 MHz The need for more than one antenna for the combined use of the aforementioned technologies causes the receiver and transmitter systems to increase in size, increase in weight and cable excess. A single antenna that allows the use of these technologies development will solve the negativities that will occur in the receiving and transmitting systems. In addition, it is preferable that the antenna to be developed should also be functional with a wide frequency band, low interference ratio.

Today, most antennas designed for wireless communication are suitable for installation on planar surfaces. These antennas are insufficient in situations where it is necessary to place them on inclined surfaces that can be found in indoor and outdoor environments. The need to develop antennas compatible with inclined surfaces is clear.

The patent application CN104143689 describes the "Three-Frequency Antenna Used for Bluetooth/RFID/WLAN/WiMAX". The invention belongs to the technical field of microstrip antennas and provides a three-frequency antenna used for Bluetooth/RFID/WLAN/WiMAX. The purpose is to increase the bandwidth of the antenna and achieve a multi-band design for the antenna. According to the technical scheme, the antenna comprises a ground plate, a feeding point, a radiation patch and a medium substrate. The radiation patch is composed of four semicircular rings, a circular ring and two rectangular strips, wherein the four semicircular rings are symmetrical in pairs and connected in sequence, the circular ring is located on the lower portion in the middle of the region defined by the four semicircular rings, and the strip line width of connection between the four semicircular rings and the circular ring inside is smaller than the strip line width from the feeding point to the four semicircular rings. The medium substrate is an epoxy plate FR4. An arch-shaped structure is arranged on the ground plate below a strip line from the feeding point to the four semicircular rings. A circular defect is arranged in the arch-shaped structure. The main application is that microstrip antennas are designed and manufactured.

In the patent application described above, a three-frequency antenna is mentioned. In addition to all the disadvantages mentioned in the current art, the product in question is disadvantageous in terms of cost.

As a result, it can overcome the disadvantages mentioned above, can radiate in multi-band, can be easily placed on convex surfaces, reduces the size and weight of different receiver and transmitter systems, greatly reduces the number of cables, is environmentally compatible, light and has a small size, easy to manufacture, operating frequency there is a need for a new technology with adjustable range and low cost.

SUMMARY

This invention is a microstrip patch antenna with a two-sided concave substrate, which can overcome the above-mentioned disadvantages, and its feature is; it is a new technology that can radiate in multiband, can be easily placed on convex surfaces, reduces the size and weight of different receiving and transmitting systems, greatly reduces the number of cables, is environmentally friendly, lightweight and small in size, easy to manufacture, adjustable operating frequency range and low cost.

The present invention solves the problems presented above with a microstrip patch antenna arrangement of the type described in the appended claims. The antenna of the invention can radiate in multi-band for WLAN 5300 MHz, WLAN 5500 MHz, 4G LTE 5200 MHz and 5G 4900 MHz applications. The antenna can be used individually or as a single antenna in multiple services in the above-mentioned applications when required and in compliance with the standards. The antenna of the invention will reduce the size and weight of different receiver and transmitter systems radiating simultaneously in WLAN, 4G LTE and 5G frequency regions, and will greatly reduce the number of cables.

Since the antenna has a concave ground plane, it is an environmentally compatible design that can be placed on inclined surfaces. The antenna of the invention also radiates in the 6400-6800 MHz frequency range that can be used in the future.

The product of the invention offers an antenna structure compatible with the environment, which allows the simultaneous use of more than one wireless communication technology with its design. The product subject to the invention can be used with wireless communication devices containing one or more of WLAN, 4G LTE and 5G technologies.

One method used in the operation of microstrip patch antennas in more than one frequency band is the use of slots on the antenna. In this way, the operating frequency range of the antenna can be adjusted, and it is provided to operate in a wider frequency band. In the product subject of the invention, two slits, the dimensions of which were calculated by computer simulation and optimization, were added to the microstrip patch antenna in order to cover the working frequency band of the desired wireless communication technologies. The slits are designed as two mutually located recesses in the patch plane of the circular microstrip patch antenna.

The sub-base in the product subject to the invention has a unique form. In scientific sources, the use of a subfloor has not been found in a structure that is concave on both sides, the upper and lower sides. Planar ground surface is used in many existing antenna structures. For this reason, it is not possible to place the antenna on inclined surfaces encountered in indoor and outdoor environments. Due to the fact that the bottom surface of the bottom base in the product subject to the invention is concave, this obstacle has been eliminated and the ability to work on surfaces with a convex slope has been provided. The fact that the upper surface of the bottom base in the product subject to the invention is concave increases the focusing and radiation pattern performance. The amount of slope of the bottom base in the product subject to the invention has been calculated and optimized. The mentioned sub-base is made of low-loss material.

Nowadays, more than half of the network traffic is realized wirelessly. Communication systems have an important place in wireless network traffic and are widely used in civil and military fields. The presence of receiving/transmitting antennas is mandatory in wireless communication systems. For this reason, the antennas to be used must be designed with the best performance In this context, antenna designs that allow the use of more than one wireless communication technology will reduce the size and weight of the receiver and transmitter systems, and will provide cable reduction.

The present invention is in the structure of a wide frequency band, low interference rate, low loss and functional microstrip antenna, which provides the mentioned benefits and allows the simultaneous use of WLAN 5300 MHz, WLAN 5500 MHz, 4G LTE 5200 MHz and 5G 4900 MHz wireless communication technologies. Unlike conventional antenna structures, which can only be placed on planar surfaces, with a specially designed two-sided concave bottom base, it provides the opportunity to be operated on convex inclined surfaces.

BRIEF DESCRIPTION OF THE DRAWINGS

The invention will be described with reference to the accompanying figures, so that the features of the invention will be more clearly understood and appreciated, but the purpose of this is not to limit the invention to these certain regulations. On the contrary, it is intended to cover all alternatives, changes and equivalences that can be included in the area of the invention defined by the accompanying claims. The details shown should be understood that they are shown only for the purpose of describing the preferred embodiments of the present invention and are presented in order to provide the most convenient and easily understandable description of both the shaping of methods and the rules and conceptual features of the invention. In these drawings.

The figures to help understand the present invention are numbered as indicated in the attached image and are given below along with their names.

DESCRIPTION OF REFERENCES

1. Patch
  1.1. First Slot
  1.2. Second Slot
2. Impedance Matching Line
3. Lower Base
4. Supply Connector
T. Ground Plane

DETAILED DESCRIPTION OF THE EMBODIMENTS

Figure 1:
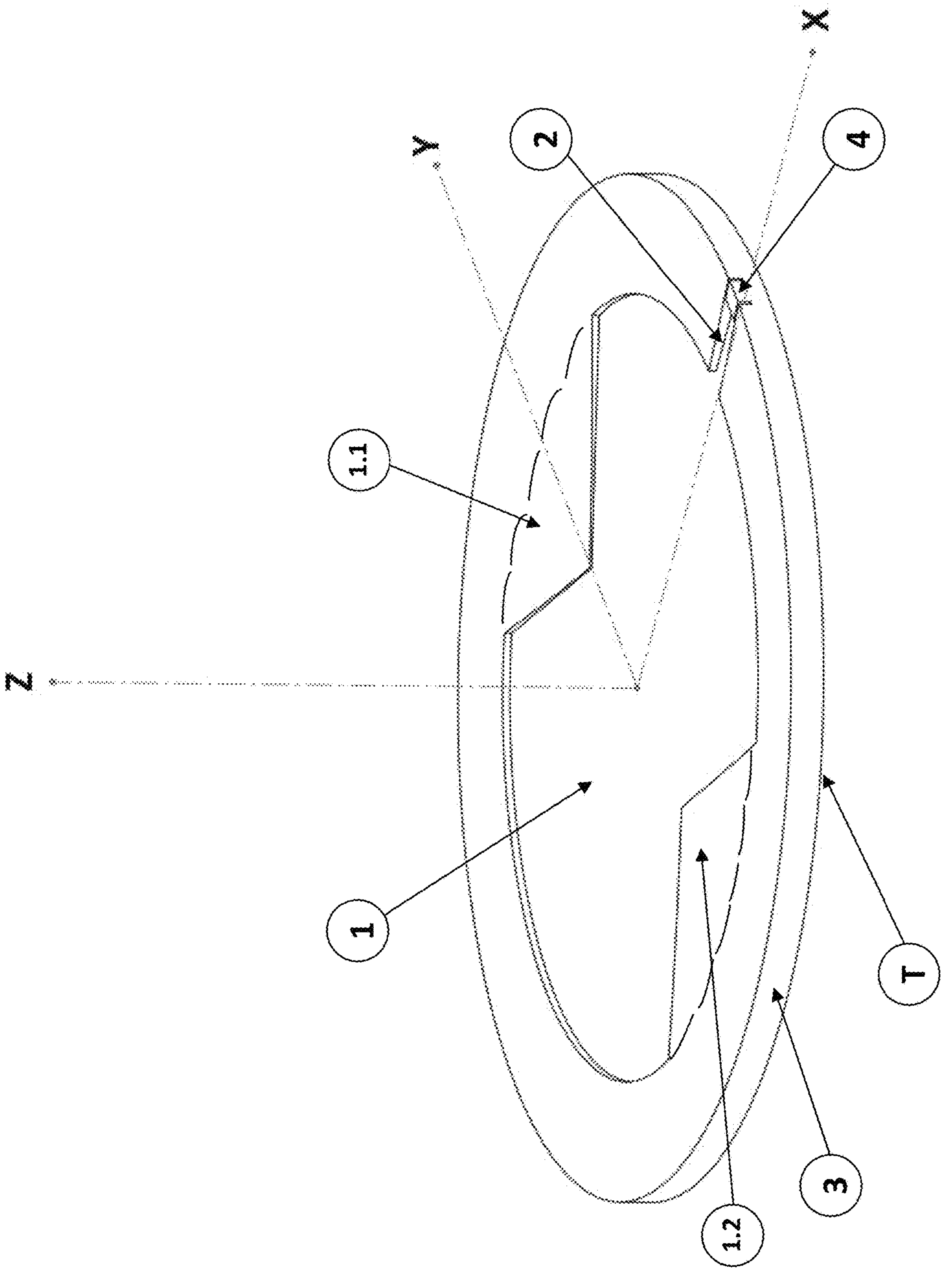
FIG. 1 Perspective view of the system.
Figure 2:
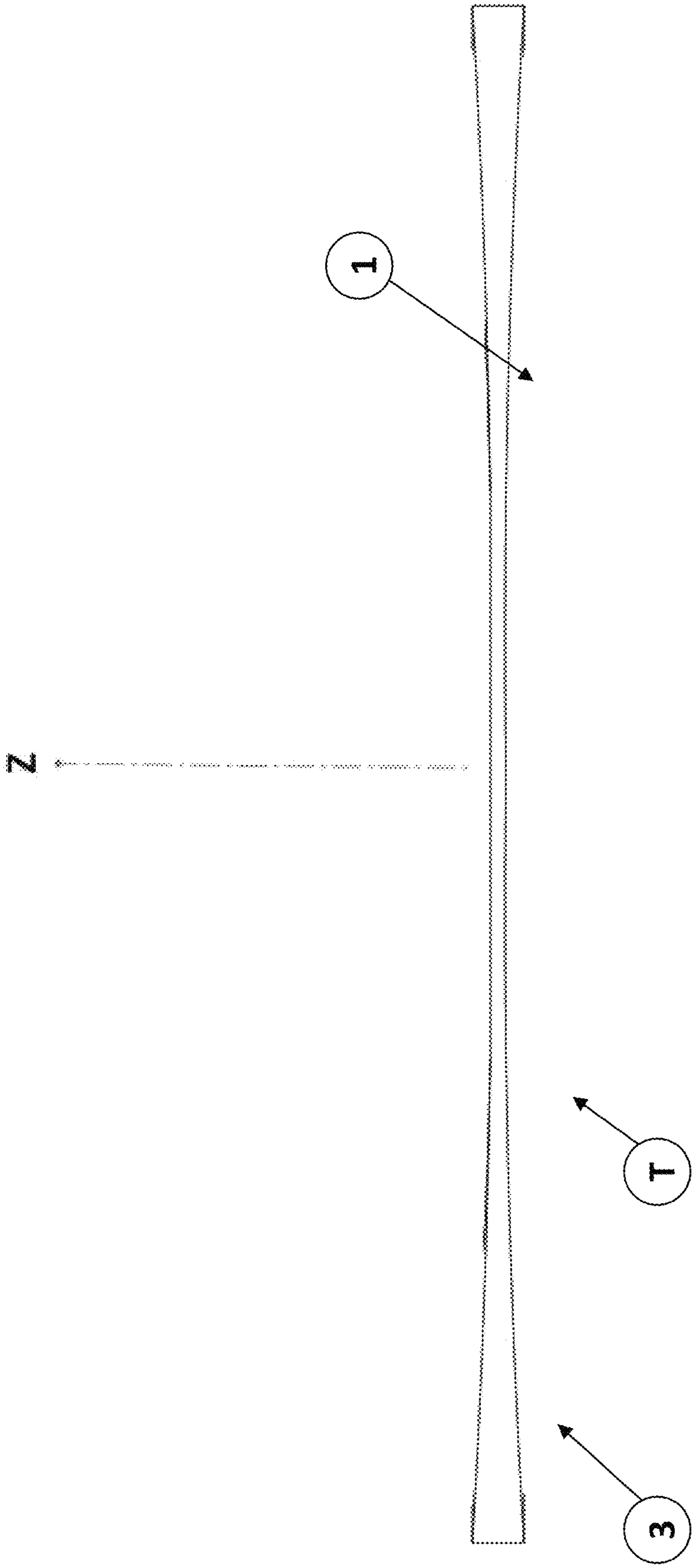
FIG. 2 Section view of the system.
Figure 3:
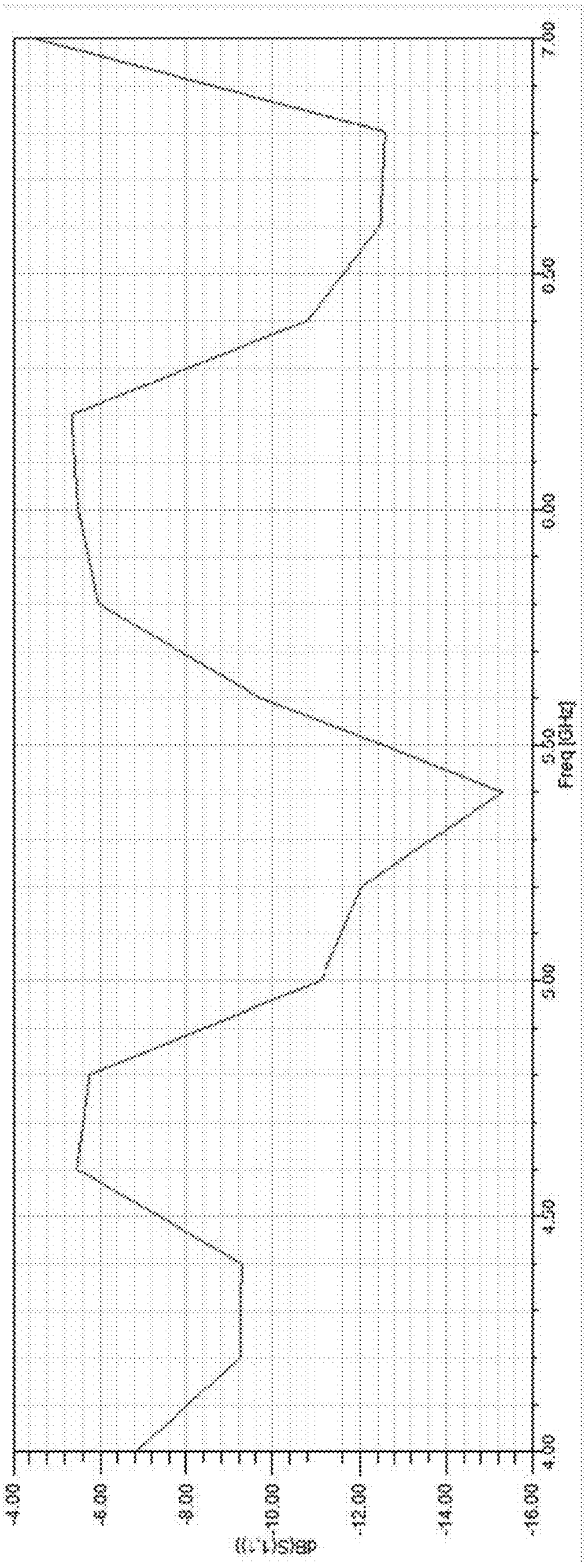
FIG. 3 View of the diagram showing the (Return Loss) in the 4 GHz and 7 GHz regions of the system.
Figure 4:
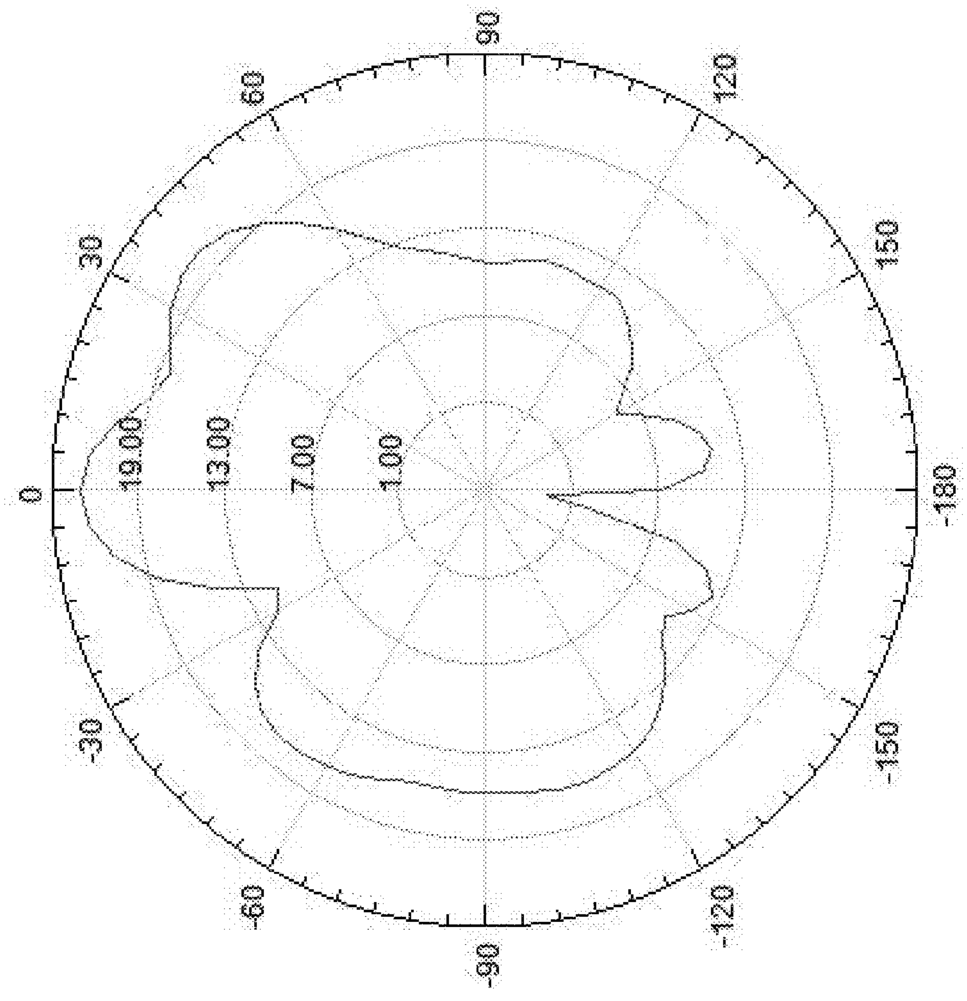
FIG. 4 View of the diagram showing the (Radiation Pattern) for the E-plane of the system.
Figure 5:
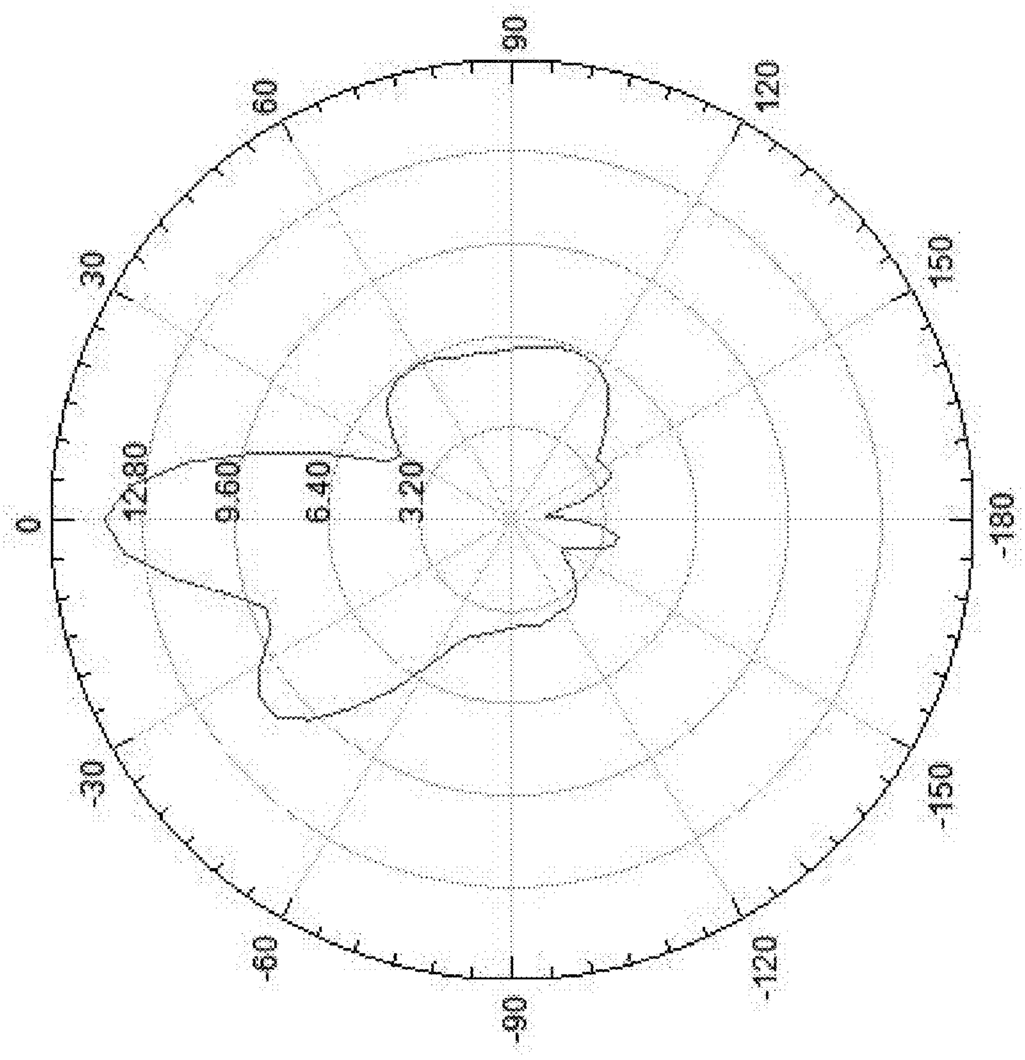
FIG. 5 View of the diagram showing the (Radiation Pattern) for the H-plane of the system.
Figure 6:
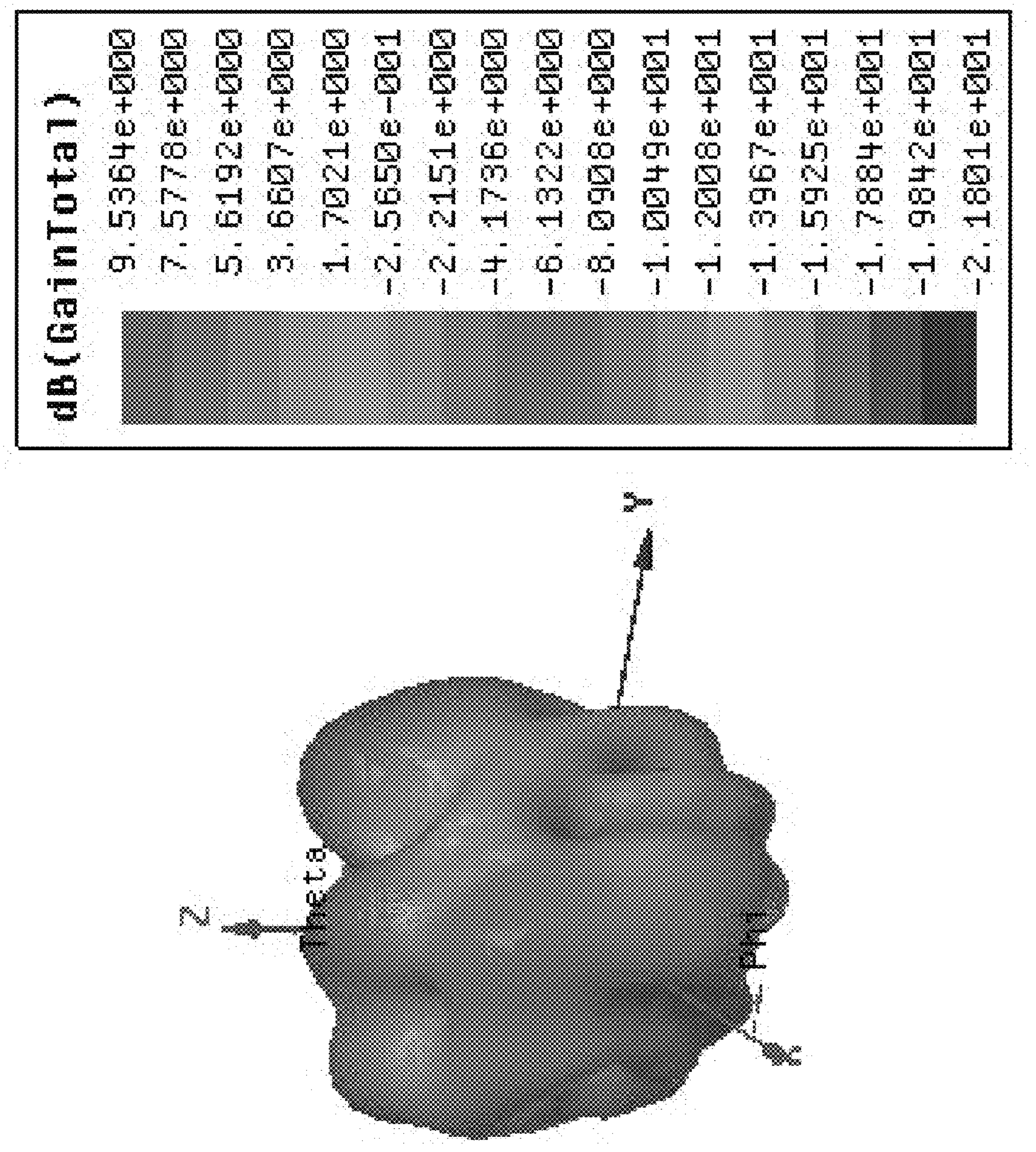
FIG. 6 View of the diagram showing the three-dimensional (gain pattern) of the system.

The invention, both the surface and the vertical axis (z) so as to be concave to the horizontal axis (X, Y) formed in a bottom a circular form, the lower base (3) with the lower base (3) to the top surface of the bottom base (3) is fixed to form a single piece with a patch (1) lower base (3) and Patch (1) with patch (1) to be a single piece is electrically connected to the impedance matching line (2), the impedance matching Line (2) with the ground plane (T) so it will be between the lower base (3) positioned along a supply connector (4) (FIG. 1, FIG. 2).

The product subject to the invention has a first slot (1.1) and a second slot (1.2) so that the operating frequency range of the system is adjustable and operates in a wider frequency band. In the product subject to the invention, the patch (1) is obtained by removing the first slot (1.1) and the second slot (1.2) in the form of two opposite indentations from a metal circle form (FIG. 1, FIG. 2).

The product subject to the invention includes the lower base (3), which includes concave surfaces that increase the focusing and radiation pattern performance. The product subject to the invention has a lower base (3) made of low loss material. Impedance matching line (2) designed to convert the antenna input impedance to 50 ohms in the product subject to the invention (FIG. 1, FIG. 2).

The product subject to the invention contains a 50-ohm power supply connector (4). The product subject to the invention is manufactured from metal material and low loss dielectric material. The product subject to the invention radiates in the multi-band range of 4940 MHz to 5600 MHz, covering WLAN 5300 MHz, WLAN 5500 MHz, 4G LTE 5200 MHz and 5G 4900 MHz applications. Optimization can be made by changing the dimensions of the product subject to the invention so that it can radiate in the range of 6400 MHz and 6800 MHz, which will be used in the future (FIG. 1, FIG. 2).

The product subject to the invention has a supply connector (4) of the same width as the impedance matching line (2). In the product subject to the invention, there is a lower base (3) containing the ground plane (T), which is in a concave structure so that it can operate on convex inclined surfaces. In the product subject to the invention, the patch (1), the impedance matching line (2), the lower base (3), the supply connector (4) and the ground plane (T) are in one piece (FIG. 1, FIG. 2).

The invention is basically; patch (1), first slot (1.1), second slot (1.2), impedance matching line (2), lower base (3), supply connector (4) and ground plane (T) (FIG. 1, FIG. 2).

The product of the invention offers an antenna structure compatible with the environment, which allows the simultaneous use of more than one wireless communication technology. In the product subject to the invention, the lower base (3) is positioned on the horizontal axes (x, y) so that its two surfaces are concave in the vertical axis (z). The patch (1) is placed on the upper part of the concave lower base (3) with two sides in horizontal axes (x, y). The lower part of the lower base (3) becomes the ground plane (T).

The impedance matching line (2) placed on the horizontal axes (x, y) is electrically connected to the patch (1). The supply connector (4) is placed along the lower base (3) on the vertical axis (z) so that it is between the impedance matching line (2) and the ground plane (T) (FIG. 1, FIG. 2).

The lower base (3) is formed in a circular form on the horizontal axes (x, y). The patch (1) is also arranged in a circular form on the horizontal axes (x, y) and has the first slot (1.1) and the second slot (1.2) placed opposite each other, which are opened for determining the operating frequency (FIG. 1, FIG. 2).

The first slot (1.1) and the second slot (1.2) are used for the inventive product to operate in more than one frequency band. In this way, the operating frequency range of the invention can be adjusted, and it is provided to operate in a wider frequency band. The dimensions of the first slot (1.1) and the second slot (1.2) in the product subject to the invention have been calculated by computer simulation and optimization to cover the operating frequency band of the desired wireless communication technologies. The first slot (1.1) and the second slot (1.2) are designed as two recesses placed opposite each other in a circular form and the resulting shape forms the patch (1) (FIG. 1, FIG. 2).

The impedance matching line (2) in the product subject to the invention is rectangular and its width was calculated during the design. The width of the supply connector (4) and the width of the impedance matching line (2) are the same (FIG. 1, FIG. 2).

Since the lower surface of the lower base (3) is concave, it is possible to work on surfaces with convex inclination. If the upper surface of the lower base (3) is concave, it improves focusing and radiation pattern performance. The slope amount of the lower base (3) has been calculated and optimized. The mentioned lower base (3) is made of low-loss material it was made (FIG. 1, FIG. 2).

In the product subject to the invention, it constitutes a one-piece structure consisting of a lower base (3), a patch (1), a ground plane (T), an impedance matching line (2) and a supply connector (4). The product subject to the invention; It can be used with wireless communication devices containing one or more of WLAN, 4G LTE and 5G technologies (FIG. 1, FIG. 2).

The product subject to the invention has a 50-ohm supply connector (4). While performing 50-ohm impedance matching, the width of the impedance matching line (2) is designed to convert the antenna input impedance to 50 ohms in the desired frequency range. For this purpose, when making impedance matching calculations, the equivalent planar thickness of the lower base (3) was calculated, and its structural properties were taken into account. In addition, the operating frequency range, and the metal thickness of the metal patch (1) are taken into account. The impedance matching line (2) is rectangular, and its width is the same as the width of the supply connector (4). The supply connector (4) is electrically connected to the impedance matching line (2) and the ground plane (T) and is positioned along the lower base (3) on the vertical axis (z) (FIG. 1, FIG. 2).

The ground plane (T) covers the lower part of the lower base (3). The product subject to the invention; together with the lower base (3), the patch (1), the ground plane (T), the impedance matching line (2) and the supply connector (4), it constitutes a one-piece structure. The product, which is the subject of the invention, operates between the frequencies of 4940-5600 MHz. The mentioned frequency range can be changed by optimizing the patch (1), impedance matching line (2), lower base (3) and ground plane (T) dimensions. The product that is the subject of the invention can also radiate in the 6400-6800 MHz frequency range, which may be used in the future. With the product of the invention, WLAN 5300 MHz, WLAN 5500 MHz, 4G LTE 5200 MHz and 5G 4900 MHz wireless communication technologies can be used simultaneously (FIG. 1, FIG. 2).

What is claimed is:

1. A microstrip patch antenna comprising:

a lower base having a circular shape on a horizontal plane and a pair of concave surfaces along vertical axes;

a ground plane positioned in a lower portion of said lower base, said ground plane having a concave shape, wherein a top surface of said lower base is a single piece;

a patch having a first slot and a second slot, wherein said lower base and said patch are fixed in a single piece that is built to work in a wide frequency range; and an impedance matching line electrically connected to said patch and said lower base;

a supply connector positioned along said lower base, said supply connector positioned between said impedance matching line and said ground plane.

2. The microstrip patch antenna of claim 1, wherein said lower base is formed of a low-loss material.

3. The microstrip patch antenna of claim 1, wherein said impedance matching line converts an antenna input impedance to a value of 50 ohms.

4. The microstrip patch antenna of claim 1, wherein said supply connector has a value of 50 ohms.

5. The microstrip patch antenna of claim 1, wherein the microstrip patch antenna is of a metallic material.

6. The microstrip patch antenna of claim 1, wherein the microstrip patch antenna has a frequency range 4940 MHz to 5600 MHz and is configured to radiate to cover WLAN 5300 MHz, WLAN 5500 MHZ, 4G LTE 5200 MHz and 5G 4900 MHz applications.

7. The microstrip patch antenna of claim 1, wherein said supply connector has a width identical to a width of said impedance matching line.

8. The microstrip patch antenna of claim 1, wherein said patch and said impedance matching line and said lower base and said supply connector are of a one-piece construction.

* * * * *